(12) United States Patent
Tillotson et al.

(10) Patent No.: US 9,524,634 B2
(45) Date of Patent: Dec. 20, 2016

(54) WIRELESS COLLECTION OF FASTENER DATA

(71) Applicant: The Boeing Company, Huntington Beach, CA (US)

(72) Inventors: Brian J Tillotson, Kent, WA (US); Bradley J Mitchell, Snohomish, WA (US); Peter E Herley, Renton, WA (US); Brenda K Carlson, Bothell, WA (US); Kevin Y Ung, Bellevue, WA (US); Tamaira E Ross, Seattle, WA (US); Steven C Venema, Kirkland, WA (US); James T Farricker, North Bend, WA (US); Daniel A Hendricks, Kenmore, WA (US); Richard R Rocks, Spanaway, WA (US); Charles B Spinelli, Bainbridge, WA (US); David B Blackwell, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/328,325

(22) Filed: Jul. 10, 2014

(65) Prior Publication Data

US 2014/0320302 A1     Oct. 30, 2014

Related U.S. Application Data

(63) Continuation of application No. 12/691,796, filed on Jan. 22, 2010, now Pat. No. 8,810,370.

(51) Int. Cl.
*G08C 17/02* (2006.01)
*H04Q 9/00* (2006.01)
(Continued)

(52) U.S. Cl.
CPC ............... *G08C 17/02* (2013.01); *F16B 31/02* (2013.01); *H04Q 9/00* (2013.01); *F16B 37/14* (2013.01);
(Continued)

(58) Field of Classification Search
CPC   G08C 17/02; H04Q 2209/40; H04Q 2209/50; H04Q 9/00; B64F 5/0045; G01L 5/246; G05B 19/4183; G05B 2219/31304; Y10T 29/49947; Y10T 29/53
(Continued)

(56) References Cited

U.S. PATENT DOCUMENTS

| 4,114,428 A | 9/1978 | Popenoe |
|---|---|---|
| RE30,183 E | 1/1980 | Popenoe |

(Continued)

FOREIGN PATENT DOCUMENTS

| CN | 1511366 A | 7/2004 |
|---|---|---|
| CN | 101453138 | 6/2009 |

(Continued)

OTHER PUBLICATIONS

Intel Labs; "WISP: Wireless Identification and Sensing Platform;" http://www.seattle.intel-research.net/wisp/; Jun. 1, 2010; 4 pp. Jun. 1, 2010.

(Continued)

*Primary Examiner* — Omer S Khan
(74) *Attorney, Agent, or Firm* — Parsons Behle & Latimer

(57) ABSTRACT

Data is remotely collected from a plurality of fasteners in response to a query signal wirelessly transmitted by a reader. Each of the fasteners includes a sensor for measuring a parameter related to the stress on the fastener. A device adapted to be attached to each of the fasteners receives the query signal, activates the sensor to measure the parameter
(Continued)

and wirelessly transmits the data including the parameter to the reader.

11 Claims, 10 Drawing Sheets

(51) Int. Cl.
*F16B 31/02* (2006.01)
*F16B 37/14* (2006.01)

(52) U.S. Cl.
CPC ...... *H04Q 2209/40* (2013.01); *H04Q 2209/50* (2013.01)

(58) Field of Classification Search
USPC ........................................................ 340/10.1
See application file for complete search history.

(56) References Cited

U.S. PATENT DOCUMENTS

| | | | |
|---|---|---|---|
| 4,294,122 A * | 10/1981 | Couchman | 73/761 |
| 4,333,351 A | 6/1982 | Bickford | |
| 4,344,216 A | 8/1982 | Finkelston | |
| 4,375,121 A | 3/1983 | Sigmund | |
| 4,602,511 A | 7/1986 | Holt | |
| 4,791,838 A | 12/1988 | Bickford et al. | |
| 4,846,001 A | 7/1989 | Kibblewhite | |
| 4,899,591 A | 2/1990 | Kibblewhite | |
| 5,018,988 A | 5/1991 | Kibblewhite et al. | |
| 5,029,480 A | 7/1991 | Kibblewhite | |
| 5,112,248 A | 5/1992 | Kibblewhite et al. | |
| 5,131,276 A | 7/1992 | Kibblewhite | |
| 5,205,176 A | 4/1993 | Kibblewhite | |
| 5,216,622 A | 6/1993 | Kibblewhite et al. | |
| 5,220,839 A | 6/1993 | Kibblewhite | |
| 5,412,582 A | 5/1995 | Hesthamar et al. | |
| 5,437,525 A | 8/1995 | Bras | |
| 5,613,549 A * | 3/1997 | Dolwani | 165/11.1 |
| 5,884,232 A | 3/1999 | Buder | |
| 6,009,380 A | 12/1999 | Vecchio et al. | |
| 6,009,759 A | 1/2000 | Kibblewhite et al. | |
| 6,263,268 B1 | 7/2001 | Nathanson | |
| 6,327,921 B1 | 12/2001 | Hsu et al. | |
| 6,354,152 B1 * | 3/2002 | Herlik | 73/597 |
| 6,358,051 B2 | 3/2002 | Lang et al. | |
| 6,501,211 B1 | 12/2002 | Nasrollahzadeh | |
| 6,691,007 B2 | 2/2004 | Haugse et al. | |
| 6,843,628 B1 | 1/2005 | Hoffmeister et al. | |
| 6,925,395 B2 | 8/2005 | Kadner | |
| 6,965,835 B2 | 11/2005 | McGee et al. | |
| 6,988,026 B2 | 1/2006 | Breed et al. | |
| 6,990,866 B2 | 1/2006 | Kibblewhite | |
| 7,136,785 B2 | 11/2006 | Mast et al. | |
| 7,180,404 B2 | 2/2007 | Kunerth et al. | |
| 7,246,980 B2 | 7/2007 | Azzalin et al. | |
| 7,369,966 B1 | 5/2008 | Scelsi et al. | |
| 7,412,808 B2 | 8/2008 | Lavi | |
| 7,412,898 B1 | 8/2008 | Smith et al. | |
| 7,441,462 B2 | 10/2008 | Kibblewhite | |
| 7,559,135 B2 | 7/2009 | Rode | |
| 7,680,565 B2 | 3/2010 | Balasu et al. | |
| 7,703,669 B2 | 4/2010 | Amirehteshami et al. | |
| 7,983,854 B2 | 7/2011 | O'Brien | |
| 2002/0162889 A1 | 11/2002 | Navon | |
| 2003/0030564 A1 * | 2/2003 | Boyce et al. | 340/679 |
| 2003/0158676 A1 | 8/2003 | Fields et al. | |
| 2003/0205187 A1 | 11/2003 | Carlson et al. | |
| 2004/0065154 A1 | 4/2004 | Kibblewhite | |
| 2004/0067120 A1 | 4/2004 | Speer | |
| 2004/0196442 A1 * | 10/2004 | D'Alessio | G03B 21/145 353/85 |
| 2005/0027826 A1 | 2/2005 | Loda | |
| 2005/0099282 A1 * | 5/2005 | Taguchi | B60C 23/0416 340/445 |
| 2006/0009924 A1 | 1/2006 | McGee et al. | |
| 2006/0025897 A1 * | 2/2006 | Shostak et al. | 701/1 |
| 2006/0109118 A1 | 5/2006 | Pelo et al. | |
| 2006/0130590 A1 | 6/2006 | Kibblewhite | |
| 2006/0198713 A1 * | 9/2006 | Azzalin et al. | 411/8 |
| 2006/0214789 A1 | 9/2006 | Posamentier et al. | |
| 2006/0243056 A1 | 11/2006 | Sundermeyer et al. | |
| 2006/0257229 A1 | 11/2006 | Bucciferro et al. | |
| 2006/0285441 A1 | 12/2006 | Walker et al. | |
| 2007/0017295 A1 * | 1/2007 | Ohta | F16B 31/02 73/761 |
| 2007/0114422 A1 * | 5/2007 | Berkcan | B64D 43/00 250/358.1 |
| 2008/0061145 A1 | 3/2008 | McGushion | |
| 2008/0061984 A1 | 3/2008 | Breed et al. | |
| 2008/0110091 A1 | 5/2008 | Perkins et al. | |
| 2008/0115589 A1 | 5/2008 | DeRose et al. | |
| 2008/0115636 A1 | 5/2008 | DeRose et al. | |
| 2008/0178713 A1 | 7/2008 | Long | |
| 2009/0038401 A1 | 2/2009 | Kibblewhite | |
| 2009/0038402 A1 | 2/2009 | Kibblewhite | |
| 2009/0071078 A1 | 3/2009 | Rakow et al. | |
| 2009/0112925 A1 | 4/2009 | Amirehteshami et al. | |
| 2009/0128169 A1 | 5/2009 | Fay et al. | |
| 2009/0157358 A1 | 6/2009 | Kim | |
| 2009/0218891 A1 | 9/2009 | McCollough, Jr. | |
| 2009/0249878 A1 * | 10/2009 | Faber et al. | 73/627 |
| 2009/0309538 A1 * | 12/2009 | Xu | H01M 10/441 320/101 |
| 2010/0050778 A1 | 3/2010 | Herley et al. | |
| 2010/0100338 A1 | 4/2010 | Vik et al. | |
| 2010/0116887 A1 | 5/2010 | Barken et al. | |
| 2010/0270996 A1 * | 10/2010 | Ramadas | H02M 1/36 323/311 |

FOREIGN PATENT DOCUMENTS

| | | |
|---|---|---|
| DE | 19746272 | 4/1999 |
| DE | 19917222 | 11/2000 |
| EP | 1188521 | 3/2002 |
| JP | 07290915 | 7/1995 |
| JP | 2005114441 | 4/2005 |
| WO | WO2007034197 | 3/2007 |
| WO | WO2011028362 | 3/2011 |
| WO | WO2011090539 | 7/2011 |

OTHER PUBLICATIONS

"Manufacturers Find Perfect Bolt Preload—Visually": Bruce Vernyi, Jul. 22, 2008 Freelance writer based in Glendale, CA, for Strees Indicators, Inc; Bruce Vernyi, Editor-in-Chief of American Machinist.
"Load Control Technologies I-Bolt": http://www.innovationplus.com/tech.php Mar. 16, 2012 Mar. 16, 2012.
European Patent Office, Examination report for EP Application No. 08253538.6 dated Aug. 3, 2012. Aug. 3, 2012.
US Patent and Trademark Office, Office Action Dated Oct. 4, 2012.
US Patent and Trademark Office; Office Action for U.S. Appl. No. 12/552,895 dated Oct. 5, 2011; Oct. 5, 2011.
US Patent and Trademark Office; Office Action for U.S. Appl. No. 12/552,895 dated Mar. 25, 2011; Mar. 25, 2011.
US Patent and Trademark Office,, Office Action dated Jun. 5, 2013 U.S. Appl. No. 12/691,796.
US Patent and Trademark Office; Final Office Action for U.S. Appl. No. 12/691,796 dated Jan. 11, 2013; Jan. 11, 2013.
US Patent and Trademark Office, Office Action Dated Oct. 4, 2012 for U.S. Appl. No. 12/536,438; Oct. 4, 2012.
US Patent and Trademark Office; Office Action for U.S. Appl. No. 12/691,796 dated July 19, 2012; Jul. 19, 2012.
US Patent and Trademark Office; Final Office Action for U.S. Appl. No. 12/536,438 dated Feb. 22, 2012; Feb. 22, 2012.
US Patent and Trademark Office; Office Action for U.S. Appl. No. 12/852,855 dated Feb. 25, 2013, Feb. 25, 2013.
US Patent and Trademark Office; Final Office Action for U.S. Appl. No. 12/582,885 dated Jul. 17, 2012; Jul. 17, 2012.

(56) References Cited

OTHER PUBLICATIONS

US Patent and Trademark Office, Office Action for U.S. Appl. No. 12/852,855 dated Aug. 2, 2012, Aug. 2, 2012.
US Patent and Trademark Office; Office Action for U.S. Appl. No. 12/536,438 dated Nov. 8, 2011; Nov. 8, 2011.
US Patent and Trademark Office; Office Actionfor U.S. Appl. No. 12/582,885 dated Dec. 16, 2011; Dec. 16, 2011.
US Patent and Trademark Office, NOA for U.S. Appl. No. 12/691,796 dtd Mar. 10, 2014, Jan. 2, 2014.
International Search Report for PCT/US2010/056888 dated Feb. 10, 2011 Feb. 10, 2011.
Chinese Intellectual Property Office; First Office Action issued in CN 201407290124810; dated Aug. 1, 2014.
Canadian Intellectual Property Office; Office Action issue in CA 2,781,606; dated Apr. 17, 2014.
Japanese Patent Office; Notice of Reasons for Rejection issued in JP 2012-549987; dated Apr. 15, 2014.
European Patent Office; Office Action for Application No. 10784621.4 Dated Sep. 7, 2015.
Chinese Intellectual Property Office; Second Office Action for Applicaiton No. 2010800619350 Dated Mar. 17, 2015.
Canadian Intellectual Property Office; Examination Search Report for Application No. 2,781,606 dated Jul. 15, 2015.
State Intellectual Property Office of PRC; Office Action for Chinese Patent Application No. 2010800619350 dated Nov. 4, 2015.

\* cited by examiner

WIRELESS COLLECTION OF FASTENER DATA

CROSS REFERENCE TO RELATED APPLICATIONS

This application is a continuation of U.S. patent application Ser. No. 12/691,796 filed Jan. 22, 2010 entitled "Wireless Collection of Fastener Data," now issued as U.S. Pat. No. 8,810,370. This application is also related to U.S. patent application Ser. No. 12/582,885 filed Oct. 21, 2009; Ser. No. 12/536,438 filed Aug. 5, 2009; and, Provisional Patent Application 61/190,986, filed Sep. 4, 2008, all of which applications are incorporated by reference herein in their entireties.

TECHNICAL FIELD

This disclosure generally relates to structural fasteners, and deals more particularly with the remote wireless collection of data from the fasteners, such as the stress on a fastener.

BACKGROUND

It is sometimes necessary to periodically check the status of fasteners used to clamp structural joints. For example, in the case of vehicles such as aircraft, the clamping force applied by fasteners in certain mission critical structural joints and assemblies must be maintained within prescribed limits. Periodic monitoring of fastener clamping force may be necessary because of the tendency of some structures to relax over time, and physical changes in the fasteners such as work hardening and creep, all of which may result in a change in the preload applied by a fastener, and thus the stress on the fastener. Where fastener preload is found to be outside of the prescribed limits, it may be necessary to re-torque the fastener, or replace it. In the past, monitoring such fasteners was performed by maintenance technicians who would physically check and record the status of the fasteners, including the level of fastener preload. This manual process was time-consuming and labor intensive, and could sometimes be difficult to perform where the fasteners were located in areas not easily accessed.

More recently, fasteners have been devised that incorporate a sensor which measures the stress, and thus the preload, on the fastener. However, in order to read the measured preload and associate it with the particular fastener being read, a technician must physically contact the fastener with a reader that reads the preload as well as a bar code that uniquely identifies the fastener. This approach to collecting fastener data can also be time-consuming, labor intensive, and difficult to perform where fastener access is limited. In some cases, where fasteners are located within a sealed-off area or a particularly small compartment, such as the tail section of an aircraft, it may not be possible to make physical contact with the fastener, thus precluding measurement of fastener preloads.

Accordingly, there is a need for a non-contact method and apparatus for remote collection of data from fasteners, such as the preload or stress on a fastener. There is also a need for a method and apparatus that may be adapted for monitoring existing types of fasteners, even where it may be difficult or impossible to physically access the fasteners.

SUMMARY

In accordance with the disclosed embodiments, a non-contact method and apparatus is provided for remotely monitoring the status of fasteners, including measuring and wirelessly collecting one or more parameters indicative of fastener status. The method uses wireless communications based on any of several wireless techniques, and can be used to collect data where the fasteners are located in areas of a structure that are difficult to physically access. The method allows a fastener ID to be reliably associated with a corresponding stress value. The apparatus uses wireless communication devices that may be easily retrofitted to existing types of fasteners. The remote, wireless collection of fastener data provided by the disclosed embodiments may substantially reduce labor costs by reducing or eliminating the need for manual inspections by technicians that require touch labor, while allowing more frequent checks of fastener status.

According to one disclosed embodiment, apparatus is provided for collecting data from a plurality of fasteners, each including a sensor for measuring the stress on the fastener. The apparatus includes a device adapted to be attached to each of the fasteners for wirelessly transmitting data related to the measured stress, and a reader for wirelessly reading the data transmitted by the device. The device may include a cap attachable to the fastener as well as an antenna and a wireless transmitter in the cap that is used to transmit the data to the reader. The reader may include a transmitter for wirelessly transmitting a signal to each of the devices. Each of the devices may further include a wireless receiver in the cap for receiving the signal from the reader and means for converting the signal into energy and for storing the energy. The device may include means in the cap for converting the stored energy into a pulse used to activate the sensor. The receiver may comprise one of an infrared signal receiver, a radio frequency signal receiver and an acoustic signal receiver.

According to another embodiment, apparatus is provided for collecting data from a plurality of fasteners, each including a sensor for measuring the stress on the fastener. The apparatus includes a reader for wirelessly transmitting a first signal along a relatively narrow path to the fastener and means on the fastener for receiving the first signal. The apparatus further includes means on the fastener for wirelessly transmitting a second signal to the reader containing data related to the stress measured by the sensor. The reader may include a transmitting antenna for forming the first signal into a relatively narrow beam. The receiving means on the fastener may include a directional antenna for receiving the first signal along the narrow path.

According to another disclosed embodiment, a method is provided of collecting data from a plurality of fasteners. The method includes wirelessly transmitting a first signal from a reader along the relatively narrow path to the fastener, and receiving the first signal at the fastener. The method also includes sensing at least one parameter at the fastener, and wirelessly transmitting a second signal related to the parameter from the fastener to the reader. The wireless transmission of the first signal from the reader may be performed using a directional antenna or a beam of energy. The energy beam may comprise radio frequency electrical energy, light energy and acoustic energy.

According to a further embodiment, apparatus is provided for collecting data from a plurality of fasteners each including a sensor for measuring the stress on the fastener. The apparatus includes a device adapted to the attached each of the fasteners for sensing the temperature of the fastener and for wirelessly transmitting data related to the measured stress and the sensed temperature. The apparatus may also include a reader for reading the data transmitted by the device. The device may include a cap attachable to the fastener, a temperature sensor in the cap, and a wireless transmitter in the cap for transmitting the data to the reader.

According to a further embodiment, a method is provided of collecting data related to the stress on a fastener. The method includes the steps of sensing at least one temperature varying parameter on the fastener related to the stress on the fastener, sensing the temperature of the fastener and adjusting the parameter based on the sensed temperature. Sensing the temperature is performed using a sensor at the fastener.

According to another embodiment, apparatus is provided for collecting data from a plurality of fasteners installed on a structure, wherein each of the fasteners includes a sensor for measuring the stress on the fastener. The apparatus includes a device on each of the fasteners coupled with a sensor for wirelessly transmitting an acoustic signal through the structure representing the measured stress. The apparatus also includes a reader for reading the acoustic signal. The device may include a cap attachable to the fastener, and a transducer in the cap for transmitting the acoustic signal through the structure. The device may include an acoustic coupler adapted to the structure for coupling the acoustic signal from the transducer to the structure. The reader may include an acoustic transducer for converting the acoustic signal into electrical energy, and an acoustic coupler for acoustically coupling the transducer with the structure.

According to another embodiment, a method is provided of collecting data from a fastener on a structure. The method includes sensing at least one parameter at the fastener, and transmitting an acoustic signal including the sensed parameter from the fastener through the structure. The method further includes reading the acoustic signal. Transmitting the signal may be performed by directing the signal along a relatively narrow path through the structure. The method may also include selecting a frequency for the acoustic signal based at least in part on characteristics of the structure.

The disclosed embodiments provide a method and related apparatus for remotely and wirelessly collecting data from fasteners installed on a structure which allow monitoring of fasteners in areas of the structure that are difficult to access and which may reduce hand touch labor.

BRIEF DESCRIPTION OF THE ILLUSTRATIONS

DETAILED DESCRIPTION

Figure 1:
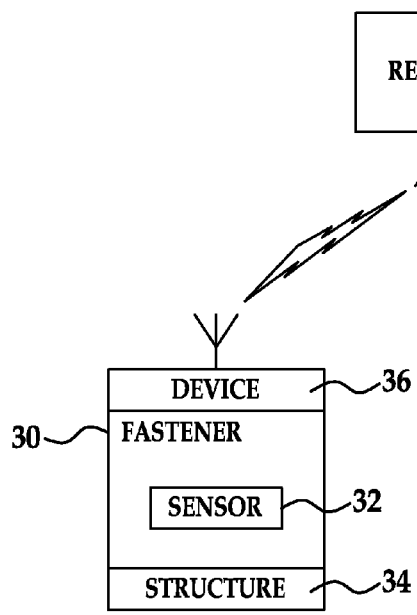
FIG. 1 is an illustration of a functional block diagram of apparatus for wirelessly collecting data from a fastener installed on a structure.

Referring first to FIG. 1, the disclosed embodiments relate to a device 36 that may be attached to a fastener 30 in order to adapt the fastener 30 for wireless communications with a remote reader 38. The fastener 30 may be installed on a structure 34 and may comprise any of a wide range of hardware devices used to mechanically join, affix or clamp two or more members together. For example, the fastener 30 may comprise, without limitations, a bolt, a screw, a stud, a clamp or a pin, to name only a few. The fastener 30 includes a sensor 32 which measures one or more parameters that are related to the status or a condition of the fastener 30. For example, the sensor 32 may comprise a transducer that measures a parameter related to the stress, and thus the preload on the fastener 30.

In one embodiment, the device 36 may be programmed to periodically transmit the measured parameter to the reader 38 so that the status of the fastener 30 may be monitored. In another embodiment, the reader 38 may query the fasteners 30 by periodically transmitting wireless signals (hereinafter sometimes referred to as "query signals") to the device 36 which results in activation of the sensor 32 to measure the desired parameter. The measured parameter is wirelessly transmitted by the device 36 to the reader 38 where the parameter may be read or may be used in calculations to determine the status of the fastener 30, such as the stress on the fastener 30. In other embodiments, calculations to determine the stress value may be performed by the device 36 which then wirelessly transmits the stress value to the reader 38. The reader 38 may provide a visual and/or audible signal to the user indicating that a particular read cycle has or has not been successfully carried out.

Figure 2:
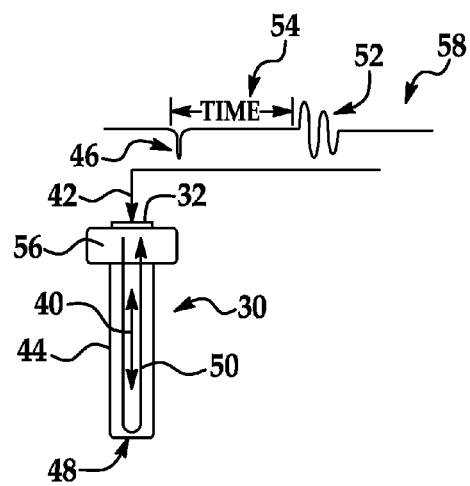
FIG. 2 is an illustration of a fastener and a timing plot useful in explaining timing measurements related to preload on the fastener.
Figure 3:
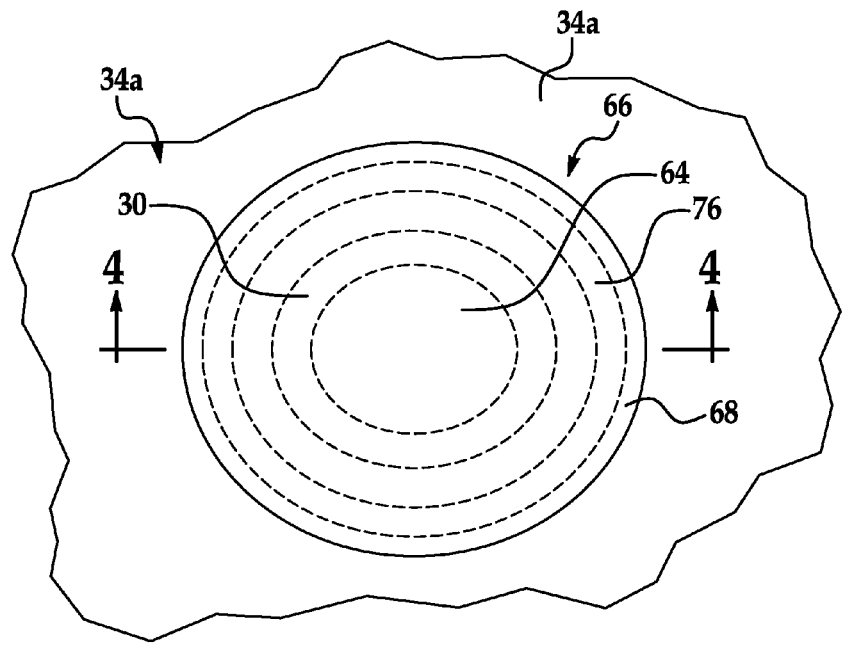
FIG. 3 is an illustration of a top view of a fastener having a cap installed thereon.
Figure 4:
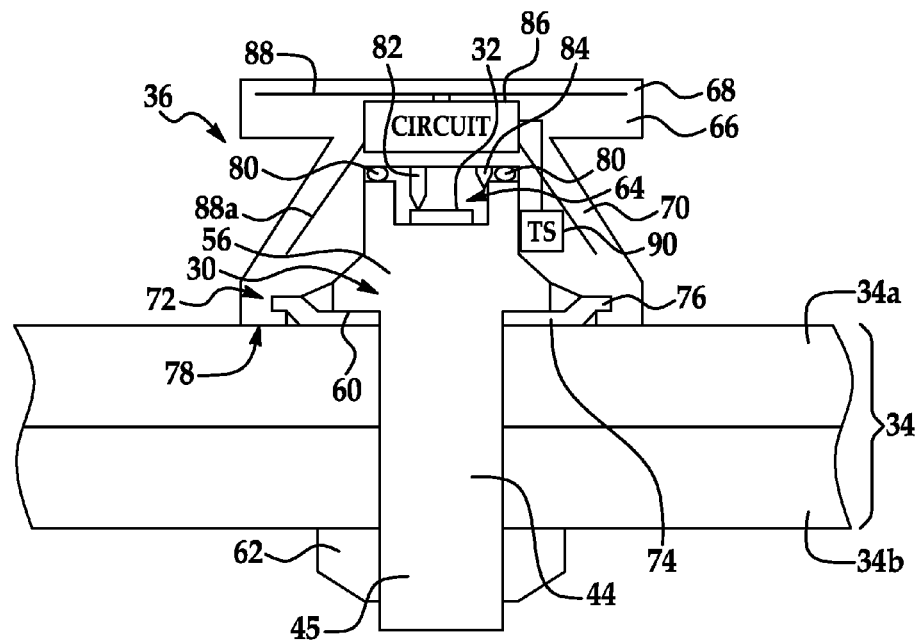
FIG. 4 is an illustration of a sectional view taken along the line 4-4 in FIG. 3.

Attention is now directed to FIGS. 2, 3 and 4 which illustrate additional details of the fastener 30 and the device 36. As best seen in FIG. 4, the fastener 30 is depicted as a bolt having a head 56, and a shank 44 that passes through a structure 34 comprising a pair of plates 34a, 34b. The lower end 45 of the shank 44 is provided with external threads (not shown) which receive a threaded nut 62. The head 56 includes a shoulder 60 which clamps a washer 74 against plate 34a when the head 56 and/or the nut 62 are tightened in order to apply a clamping force which holds the plates 34a, 34b together.

The preload, and thus the stress on the fastener 30 is a function, in part, of the clamping force applied by the fastener 30 to the structure 34. The device 36 includes a cap 66 formed of a suitable rigid material such as a metal, however in some applications it may be possible to form the cap 66 from composites or other high strength materials. The cap 66 includes a head 68 which, in the illustrated example, is generally circular, however other shapes are possible. For example, the head 68 may include wrench flats (not shown) forming a hexagonal or octagonal shape suitable to be engaged by a wrench (not shown) employed for installing the device 36 on the fastener 30.

The cap 66 further includes inclined sides 70 which surround the head 56 of the fastener 30 and include a ring shaped bottom 78 that may engage the structure 34. The cap 66 includes a circumferential recess 72 therein, near the base 78, which complementarily receives an upturned flange 76 on the outer periphery of the washer 74. Thus, the cap 66 is attached to the fastener 30 by the flange 76 which retains the cap 66 on the head 56 of the fastener 30.

The device 36 also includes an electronic circuit 86 housed within the cap 66. In one embodiment, an antenna 88 connected with the circuit 86 may be integrated into the head 68 of the cap 66, while in another embodiment, the antenna 88a may be integrated into the sides 70 of the cap 66. In yet another embodiment, the both antenna 88 and 88a may be integrated into the cap 66.

The head 56 of the fastener 30 includes a central recess 64 containing a sensor 32 which will be discussed in more detail below. The sensor 32 measures at least one parameter indicative of the status of the fastener 30 which is either transmitted directly to the reader 38 (FIG. 1), or used in calculations performed by the circuit 86 to determine the status of the fastener 30. The cap 66 is sealed to the head 56 of the fastener 30 around the periphery of the recess 64 by means of a compressible O-ring 80, thereby sealing the recess 64 against intrusion of moisture and/or foreign particles. The device 36 further includes a pair of electrical contacts 82, 84 which are coupled with the circuit 86 and respectively contact the sensor 32 and fastener head 56 when the cap 66 is installed on the fastener 30. An optional temperature sensor 90 mounted on the cap 66 is coupled with the electrical circuit 86 and contacts the fastener head 56 in order to measure the temperature of the fastener 30, or the temperature of the structure 34 immediately surrounding the fastener 30.

As previously indicated, the washer 74 adapts the cap 66 to be attached to the head 56 of the fastener 30. However, it may be possible to attach the device 36 to other parts of the fastener 30, or to the nut 62 using other attachment techniques that may not require the use of the washer 76. In one embodiment, the cap 66 and the washer 76 may be configured to provide a bayonet type mounting (not shown) so that the cap 66 is attached to the fastener 30 by a twist-on action. Alternatively, it may be possible to provide threads (not shown) between the cap 66 and the fastener 30 and/or washer 74 which adapt the cap 66 to be screwed onto the fastener 30 and/or the washer 74. From the foregoing then, it may be appreciated that existing fasteners 30 may be retrofitted with the device 36 by installing the washer 74 and then attaching the cap 66 to the washer 74 using a twist-on motion. In some embodiments, the cap 66 may be removed from the fastener 30 with a reverse, twist-off motion in order to allow repair or replacement of the cap 66.

Referring now particularly to FIG. 2, the sensor 32 may comprise any of a variety of sensors or transducers using any of various technologies suitable for measuring one or more parameters indicative of the status of the fastener 30, including but not limited to those that may be used to determine the stress or preload 40 in the fastener 30. In one embodiment, the sensor 32 may use ultrasonic techniques to measure a "time-of-flight" that is directly related to the preload 40 on the fastener 30. A voltage pulse applied to the sensor 32 at 42 propagates through the shank 44 as an ultrasonic wave 46 that is reflected off of the end 48 of the fastener 30 and travels back along the return path 50 to the sensor 32. The ultrasonic wave 46 is returned as an echo 52 that is recorded by the sensor 32, and which has a time-of-flight 54 that is directly proportional to the preload of the fastener 30. Evaluating a change in the time-of-flight 54 relative to a zero load time-of-flight allows direct measurement of the preload 40. During tightening, the fastener 30 elongates with load while the speed of the ultrasonic wave 46 reduces with increasing fastener stress, resulting in an increase in the total time-of-flight 54 that is directly proportional to the preload 40. As previously mentioned, while an ultrasonic type sensor 32 has been illustrated, other sensors and transducers using other types of technologies may be possible.

Figure 5:
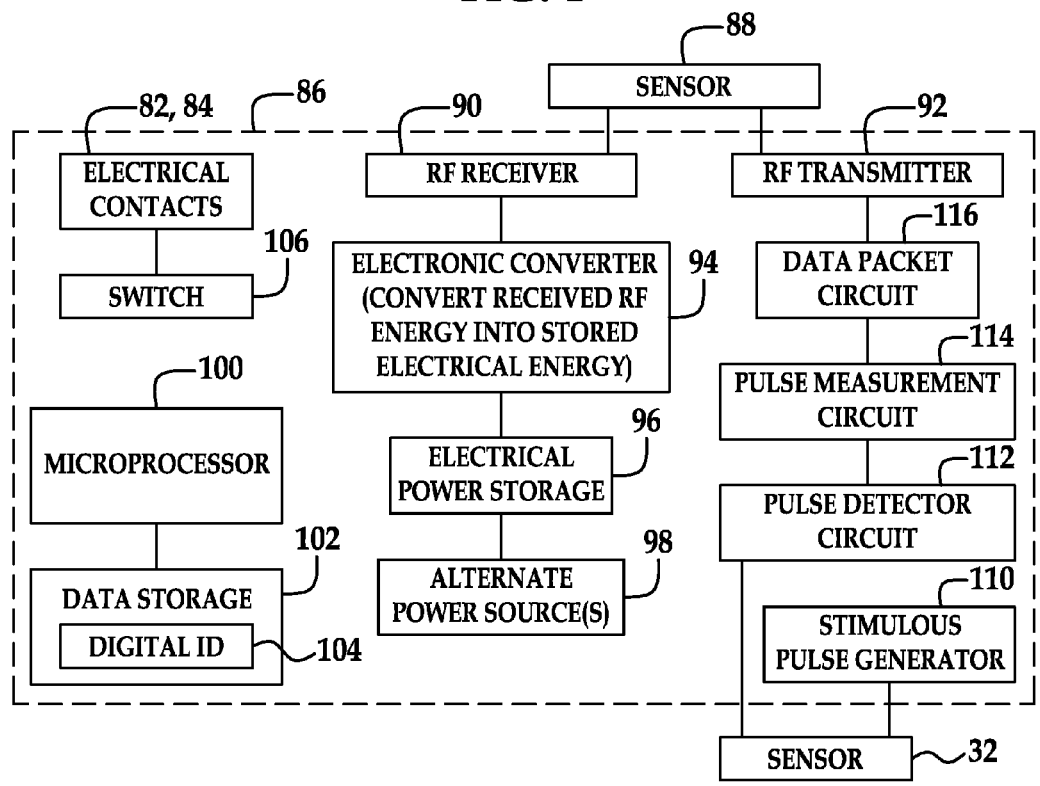
FIG. 5 is an illustration of a functional block diagram of an electronic circuit contained within the fastener cap shown in FIGS. 3 and 4.

Attention is now directed to FIG. 5 which illustrates additional details of the electronic circuit 86 that is housed within the cap 66 (FIG. 4) and is coupled with both the sensor 32 and the antenna 88. In this embodiment, the circuit 86 includes a radio frequency (RF) receiver 90 and an RF transmitter 92 which may be combined into a single circuit forming a transceiver (not shown). An RF signal transmitted from the reader 38 (FIG. 1) representing a fastener query is delivered by the receiver 90 to an electronic converter 94 which converts the received RF signal into electrical power that may be stored in an electrical energy storage device 96, such as a capacitor or other storage medium (not shown). The RF query signal may comprise a series of pulses that are successively stored until the energy stored in the storage device 96 is sufficient to initiate a read cycle. The circuit 86 may also be powered by one or more alternate power sources 98, such as a battery, energy harvesters or other power generators (not shown). For example, the alternate power source 98 may comprises an energy harvesting device within the cap 66 that harvests ambient energy such as thermal energy produced by temperature fluctuations in the fastener 30. This form of energy harvesting device may employ a phase change material as a heat sink against temperature fluctuations in the fastener 30, which may be significant in the case of an aircraft during climb/decent. Energy harvesting devices using other technologies may be employed, including but not limited to those that harvest vibrational energy produced by atmospheric pressure changes during climb/decent of an aircraft.

As the cap 66 is being installed on the fastener 30, the contacts 82, 84 are brought into engagement with the fastener 30 and the sensor 32, causing the switch 106 to close. Closure of the switch 106 readies the circuit 86 for operation. In the event that the cap 66 is subsequently removed from the fastener 30, causing the contacts 82, 84 to disengage from the fastener 30, the switch 106 opens and causes a unique digital identification (ID) number 104 in the data storage 102 to be erased. This feature may assure that a particular ID is permanently and reliably associated with only one particular fastener 30.

Energy stored in the energy storage device 96 is used to fire a pulse generator 110 which causes the sensor 32 to produce an ultrasonic pulse 46 (FIG. 2) that propagates through the fastener 30, as previously described. A pulse detector circuit 112 senses the return pulse and delivers the return pulse to a pulse measurement circuit 114 which measures the time-of-flight of the pulse. The measured time-of-flight, which represents a parameter related to the stress on the fastener 30, is delivered to a data packet circuit 116 which combines the time-of-flight measurements with other data into a data packet. For example, the unique digital ID number 104 stored in data storage 102 in the circuit 86 may be combined with the time-of-flight information into a data packet. The data packet is transmitted through an RF transmitter 92 and the antenna 88 back to the reader 38 (FIG. 1). In some embodiments, the circuit 86 may include a microprocessor 100 to control various components of the circuit 86 and/or to perform calculations. For example, the microprocessor 100 may compare a fastener ID contained in the RF signal received from the reader 38 to the digital ID 104 in data storage 102 in order to verify that the query is intended for the particular fastener 30 that receives the query signal. Once a match between these two IDs is confirmed, measurement and transmission functions may be carried out by the circuit 86.

Figure 6:
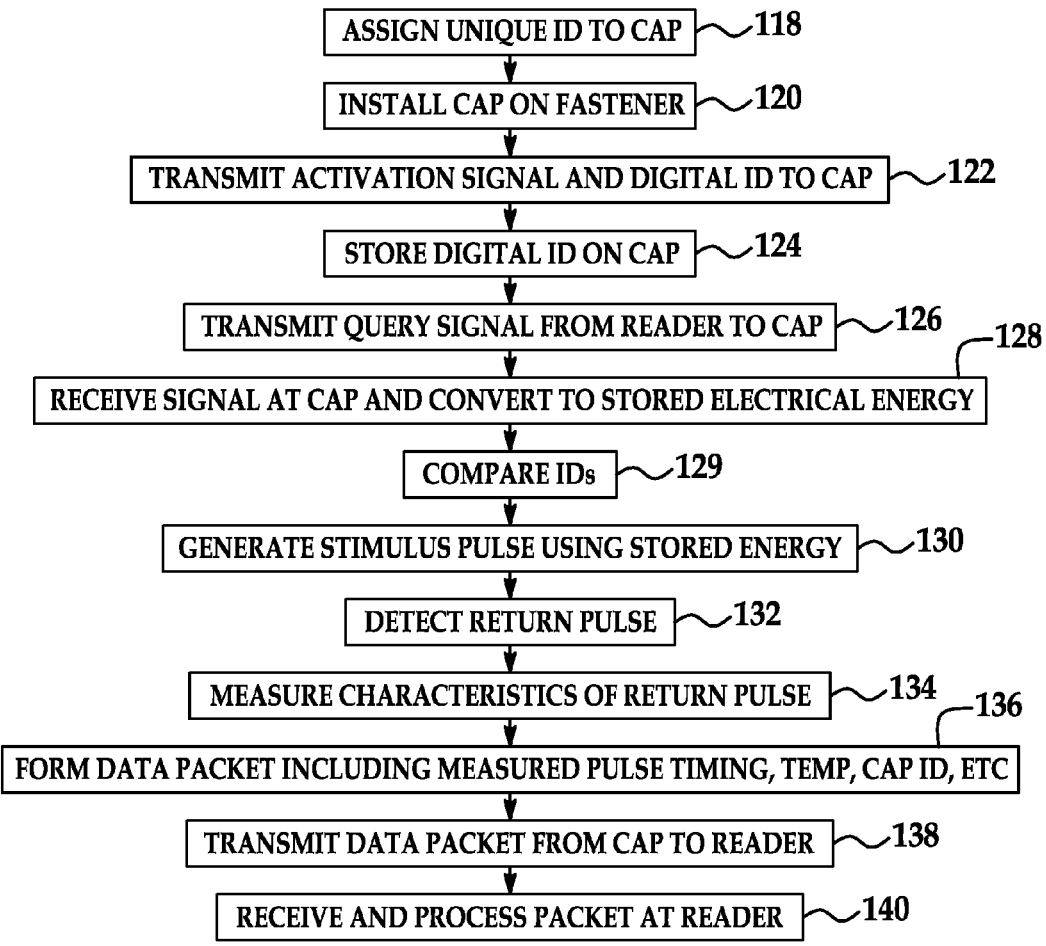
FIG. 6 is an illustration of a flow chart of a method of wirelessly collecting fastener data using the cap device shown in FIGS. 3-5.

Attention is now directed to FIG. 6 which broadly shows the steps of a method of wirelessly collecting data from one or more fasteners 30, such as fastener preload. Beginning at 118, a unique ID is assigned to each of a plurality of the caps 66. This unique ID may be a random ID, or may be related to a specific bolt location in a structure, or may be otherwise assigned. At 120, a cap 66 is installed on each of the fasteners 30. At step 122, an activation signal along with a digital ID is transmitted from the reader 38 to the cap 66. At 124, the digital ID is stored in the cap 66, thereby readying the cap 66 for operation.

The data collection process begins at step 126 in which a query or read signal is transmitted from the reader 38 to the cap 66 on one or more of the fasteners 30. At 128, the query signal is received at the cap 66 and is converted into stored electrical energy within the cap 66. Assuming that the ID contained in the query signal (representing the fastener 30 that is to be read) matches the stored ID in the cap 66 on the fastener 30 receiving the query signal, the measuring and transmission functions are initiated, resulting in the generation of a stimulus pulse at 130, using the energy stored at 128. The return pulse is detected at 132 and its time-of-flight is measured at 134. At 136, a data packet is formed which includes the measured time-of-flight and other information, such as, without limitation, fastener ID, fastener temperature, time/date stamp, etc. At step 138, the data packet is transmitted in the form of an RF signal from the cap 66 to the reader 38 where it is received and processed at step 140.

Figure 7:
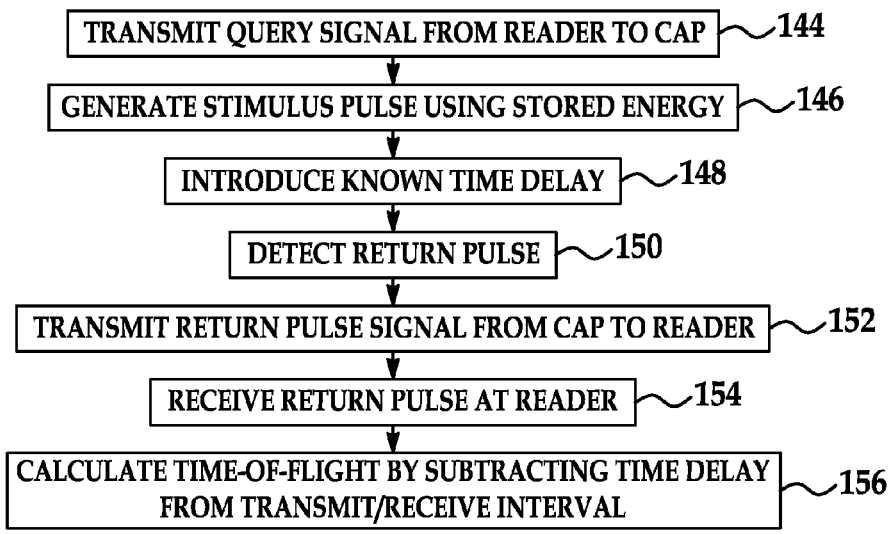
FIG. 7 is an illustration of a flowchart of an alternate method of collecting fastener data.

FIG. 7 illustrates the steps of an alternate method for collecting data from the fasteners 30. Beginning at step 144, a query signal is wirelessly transmitted from the reader 38 to the cap 66. At 146, a stimulus pulse is generated which is delivered through the fastener 30. At 148, a fixed processing time delay is introduced to allow for the reliable detection of the returning ultrasonic pulse. The return pulse is detected at 150, and detection information is transmitted at 152 from the cap 66 to the reader 38. The return pulse is received at the reader 38, as shown at step 154, following which the reader 38 measures the time between the RF start pulse and the RF finish pulse, and then subtracts the fixed processing time delay and computes the ultrasonic time-of-flight as the difference between these two pulses as shown at 156. This embodiment may reduce and simplify the electronics 86 in the cap 66 since the cap 66 no longer makes a timing measurement.

Figure 8:
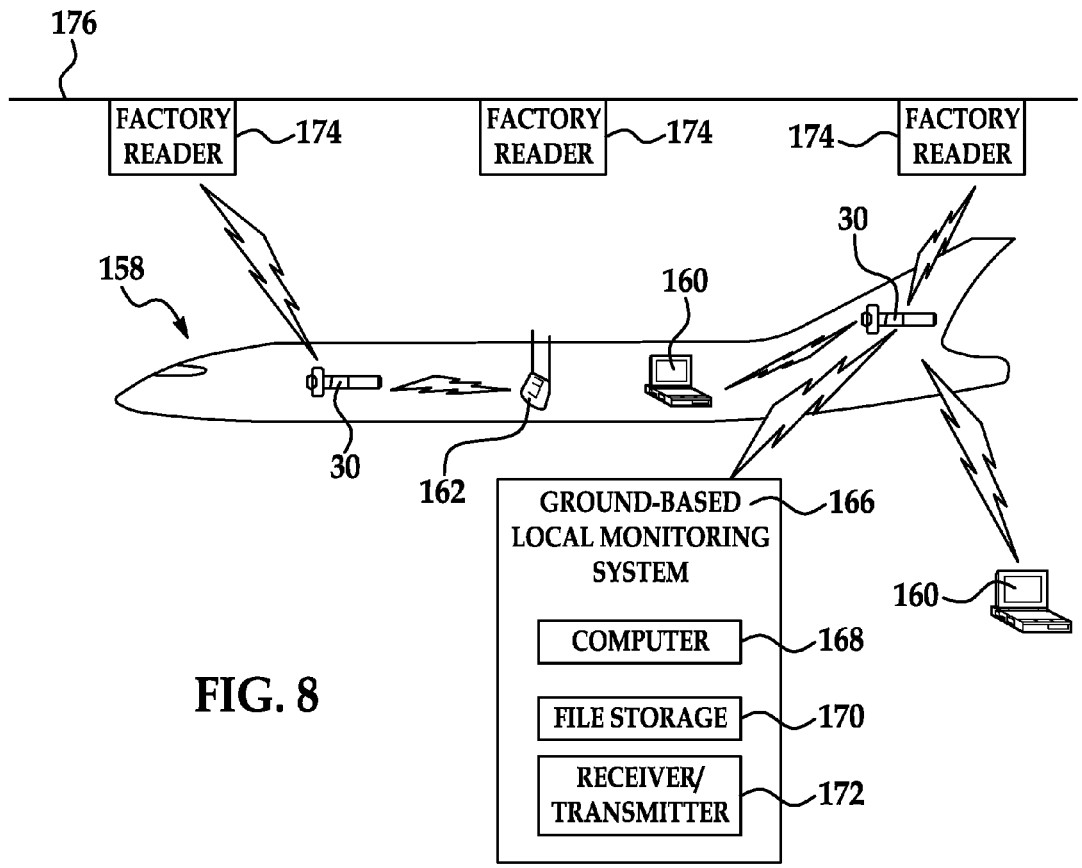
FIG. 8 is an illustration of a combined block and diagrammatic view showing collection of data from fasteners installed on an aircraft.

Referring now to FIG. 8, data may be collected remotely from fasteners 30 installed on structures, such as an aircraft 158, using either mobile readers 160 or fixed readers 162 that are located remote from the fasteners 30. For example, mobile readers 160 may be used by maintenance technicians either onboard the aircraft 158 or on the ground to monitor the status of the fasteners 30, including fastener preload. Alternatively, readers 162 at fixed locations onboard the aircraft 58 may be used to periodically monitor fastener status by collecting fastener data that may be stored for future use or sent to an onboard server (not shown) for analysis. Similarly, a fixed, ground based monitoring system 166 may wirelessly collect the data from the fasteners 30 which is then processed locally by a computer 168 and stored at 170 as part of maintenance records, and/or wirelessly transmitted by a receiver/transmitter 172 to other sites.

The disclosed method and apparatus may also be advantageously employed in a factory production setting or in a maintenance facility setting where structures such as the aircraft 158 are being assembled or serviced. For example, fixed or mobile readers 174 may be installed on a ceiling 176 or embedded in/under a floor or into tooling fixtures/stands/scaffolding (all not shown) of a factory in which the aircraft 158 is being assembled. The readers 174 may collect data such as preload from the fasteners 30 as the aircraft 158 is being assembled in order to verify that fasteners 30 are properly installed and/or torqued to specifications.

In some applications, it may be desirable to deliver signals between the reader 38 and the fasteners 30 through wireless transmissions that are substantially directional along a relatively narrow path, rather than omni-directional. Directional transmissions may be more effective than omni-directional transmissions since a larger fraction of the transmitted signal energy reaches its intended destination, i.e. the fastener 30 or the reader 38. This technique may improve battery life as well as the time required to query each fastener 30.

Figure 9:
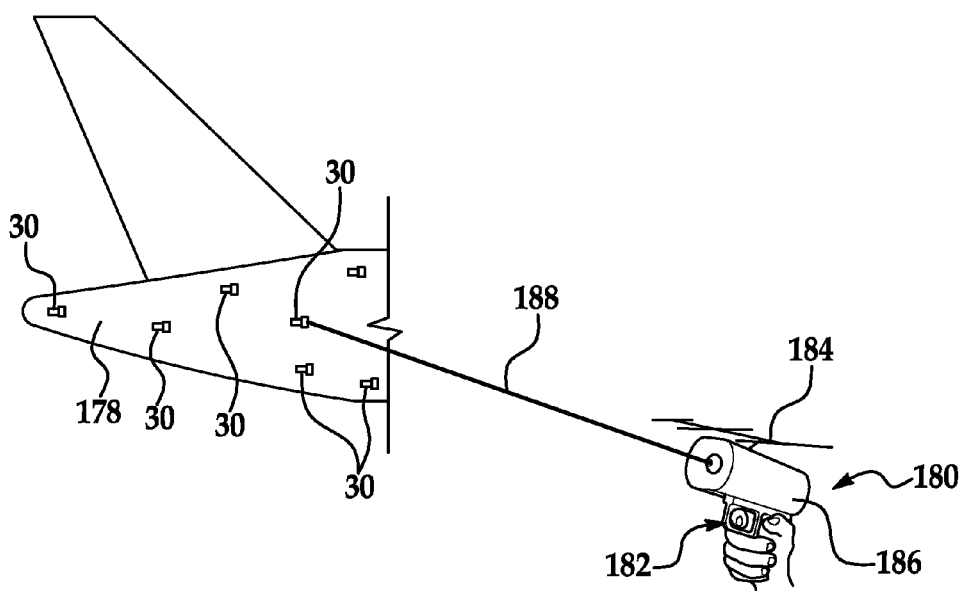
FIG. 9 is an illustration of a method and apparatus for collecting data from fasteners using directional signals transmitted along relatively narrow paths.

Referring now to FIG. 9, a suitable radio frequency reader 180 may be packaged as a handheld device used by maintenance technicians to read fastener data where access to the fastener 30 may be difficult, as in the case of the tail section 178 of an aircraft 158. In this embodiment, the reader 180 includes a pistol grip 182 that allows the user to orient and aim the reader 180 toward a desired fastener 30. The reader 180 includes a directional antenna 184 comprising one or more dipoles arranged as a phased array that is used to transmit query signals and receive responsive RF signals from the fasteners 30 containing data packets. In this embodiment, the operator first physically locates a fastener 30 to be measured and then points the reader 180 at the fastener to take the measurement. The reader 180 may further include an aiming device such as a laser 186 which directs a laser beam 188 toward a particular one of the fasteners 30. The laser beam 188 is aligned with the orientation of the directional antenna 184 so that by pointing the laser beam 188 toward a particular fastener 30, the transmission path of the antenna 184 is automatically aligned toward the fastener 30. This embodiment may further improve the energy efficiency of the system, extend battery life and/or reduce labor hours required to measure the stress of a given set of fasteners 30.

Figure 10:
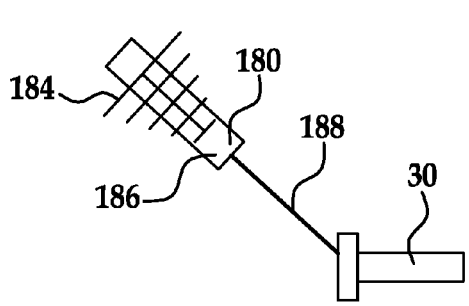
FIG. 10 is an illustration of the use of a laser beam to aid in aiming a directional antenna on a reader.
Figure 11:
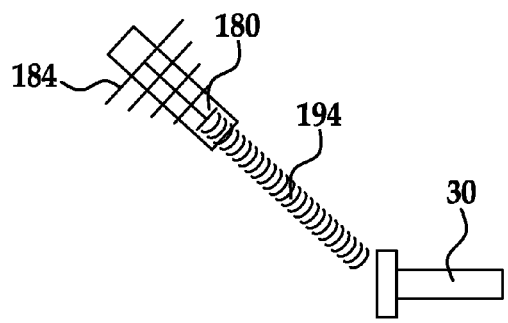
FIG. 11 is an illustration similar to FIG. 10 but showing the transmission of a radio frequency query signal to the fastener after the reader has been aimed.
Figure 12:
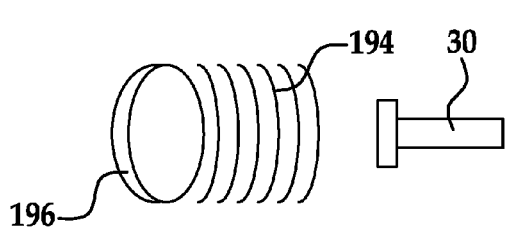
FIG. 12 is an illustration showing the use of a dish type antenna for transmitting radio frequency signals along a relatively narrow path to a fastener.

FIG. 10 shows the laser beam 188 having been directed toward a particular fastener 30. With the antenna 184 aligned in the direction of the fastener 30, an RF signal is transmitted along a relatively narrow path 194 (FIG. 11) from the antenna 184 to the fastener 30 (FIG. 11). Other techniques may be employed to concentrate an RF signal along a relatively narrow path. For example, an antenna dish 196 (FIG. 12) may be employed to concentrate or focus an RF signal along a relatively narrow path 194 toward a fastener 30 as shown in FIG. 12. Directional antennas may be preferred in some applications over omni-directional antennas, in order to reduce possible radio frequency interference (RFI) and/or to reduce the amount of power that is required to transmit the signal. The antenna 88 (FIG. 4) housed in the cap 66 may similarly be configured in the form of a directional antenna in order to reduce the power consumed in sending the data packet to the reader 180.

Figure 13:
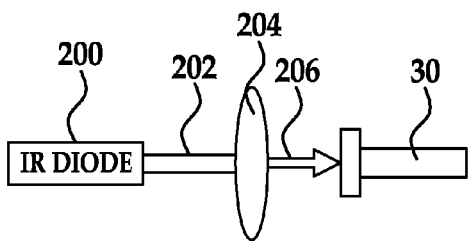
FIG. 13 is an illustration of the use of a lens to focus infrared energy into a beam used to query a fastener.
Figure 14:
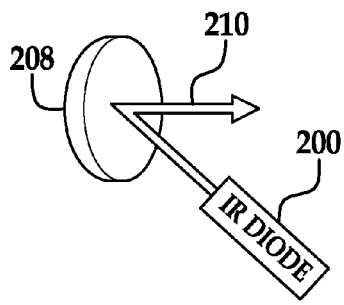
FIG. 14 is an illustration showing the use of a dish reflector to concentrate infrared energy produced by a diode.

Other forms of communication techniques may be employed to collect fastener data according to the disclosed embodiments, including acoustic (sonic) energy and electromagnetic energy in the visible and near-visible frequency ranges, sometime referred to as light energy. For example, as shown in FIG. 13, pulses of infrared light may be employed to transmit query signals to fasteners 30 in which an infrared diode 200 produces pulses of infrared light 202 that are focused into a narrower beam of pulses 206 by a suitable lens 204. The lens 204 and the reader 38 are aimed at a fastener 30 so that the infrared pulse beam 206 impinges upon a desired fastener 30 to initiate a read cycle. FIG. 14 illustrates the use of a reflective dish 208 for concentrating light produced by an infrared diode 200 into a concentrated pulse beam 210. Aiming of the beam 210 toward a desired fastener 30 is controlled by the orientation of the dish 208 which may be mounted on the reader 38. The use of infrared signals may be desirable in "noisy" RF environments such as factories or airports. In the infrared communication system described above, shorter wavelengths may allow higher gain factors and may be more desirable in some applications.

Figure 15:
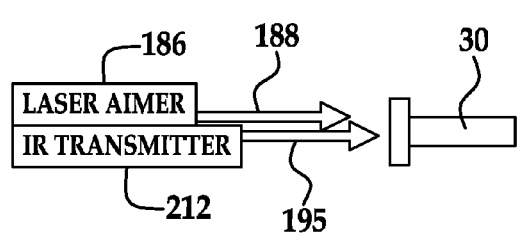
FIG. 15 is an illustration showing the use of a laser to aim an infrared transmitter forming part of a reader.

FIG. 15 illustrates the use of a laser aimer 186 in combination with an infrared transmitter 212 to locate and query a desired fastener 30. The laser aimer 186 produces a visible laser beam 188 which the user may employ to locate and aim the infrared transmitter 212. Once the transmitter 212 is properly aimed, an infrared query signal 195 is sent to the fastener 30, thereby initiating a read cycle.

Figure 16:
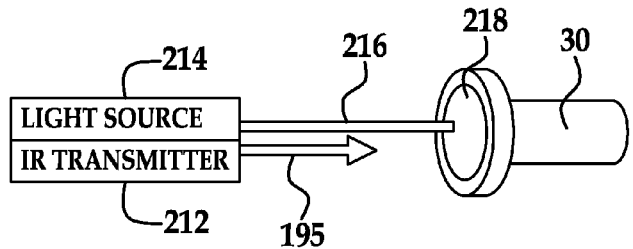
FIG. 16 is an illustration similar to FIG. 15, but showing the use of a visible light source to aim the infrared transmitter on the reader.

FIG. 16 illustrates the use of a conventional, visible light source 214, such as an ordinary flashlight that is mounted on an infrared transmitter 212. The light source 214 produces a visible light beam 216 that is used to illuminate a fastener 30. A retro-reflective material 218 may be placed on the fastener 30 in order to assist in reflecting light from the light source 214 so that the fastener 30 is more visible to a technician. Aiming of the light beam 216 at the fastener 30 automatically aligns the infrared transmitter 212 so that the RF signal is directed toward the fastener 30.

Figure 17:
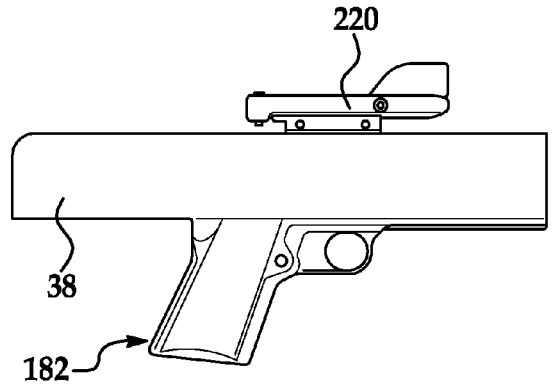
FIG. 17 is an illustration of a side view of a reader that includes a pistol grip and optical sight for aiming the reader toward a fastener.

In another embodiment, as shown in FIG. 17, a reader 38 may employ a pistol grip 182 and an optical sight 220 to aim the reader 38 toward a desired fastener 30 in those applications where the reader 38 generates directional query signals.

Figure 18:
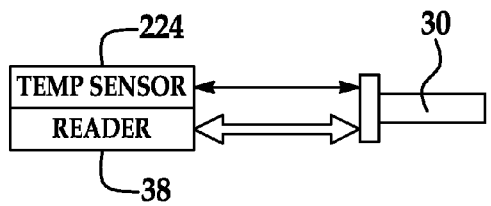
FIG. 18 is an illustration of a reader that includes a temperature sensor for remotely sensing the temperature of a fastener or the structure surrounding the fastener.

As previously discussed in connection with FIG. 4, it may be desirable to sense the temperature of the fastener 30 in order to adjust time-of-flight information and improve the accuracy of preload measurements. In the case of the embodiment shown in FIG. 4, a temperature sensor 90 for this purpose is incorporated into the cap 66. Other techniques, however, may be employed to sense the temperature of a fastener 30, or of the structure 34 immediately surrounding the fastener 30 which normally will have a temperature that is substantially the same as that of the fastener 30. For example, as shown in FIG. 18, a non-contact temperature sensor 224 may be incorporated into the reader 38 in order to remotely sense the temperature of a fastener 30. The temperature sensor 224 may comprise any of various known non-contact temperature sensing devices, such as, without limitation, pyrometers, infrared thermal imaging cameras, line measuring thermometers, spot radiometers and infrared radiation thermometers. Typical infrared radiation thermometers measure infrared emissions in at least two wavelength bands, compute the ratio of intensities of the two bands and use that ratio to estimate a temperature of the emitting surface.

Figure 19:
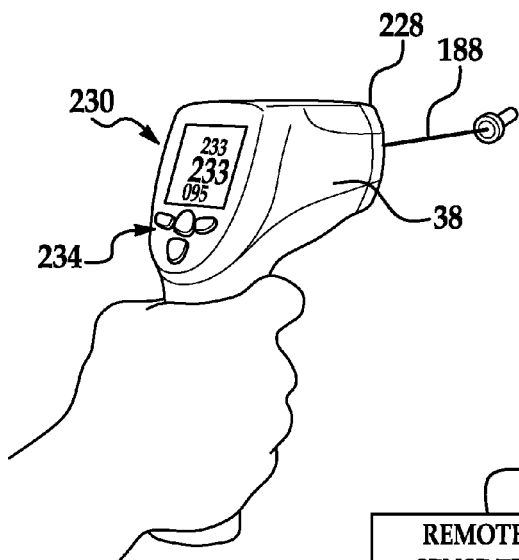
FIG. 19 is an illustration of a perspective view of a reader having a non-contact temperature sensor and a pistol grip to aid in aiming the reader.

FIG. 19 illustrates a handheld gun-type reader 38 which incorporates an infrared radiation thermometer 228 and a laser beam 188 to aid in aiming the reader 38. The reader 38 may include a display screen 230 and suitable controls 234 which are used to actuate the laser beam 188, take a fastener temperature reading and initiate a query signal that is automatically associated with the sensed temperature. The display screen 230 along with one or more programs (not shown) stored in the reader 38 may be used to show the user where each fastener 30 is located to assist in aiming the reader 38.

Figure 20:
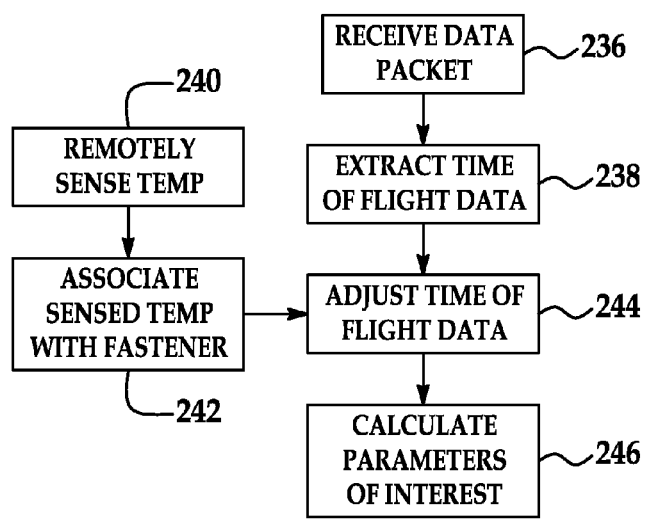
FIG. 20 is an illustration of a flow chart showing a method of collecting fastener data which includes adjustments based on the sensed temperature of the fastener.

Attention is now directed to FIG. 20 which illustrates the steps of a method of collecting fastener data which includes adjusting fastener parameter measurements for variations in the temperature of the fastener 30. At 236, a data packet containing time-of-flight information is received at the reader 38, following which the time-of-flight data is extracted at 238. The temperature of the fastener 30 is remotely sensed at 240 and is associated with the particular fastener 30 at 242. At 244, the temperature associated with the fastener is used to adjust the time-of-flight data, as shown at 244, following which parameters of interest, such as fastener stress may be calculated at 246.

Figure 21:
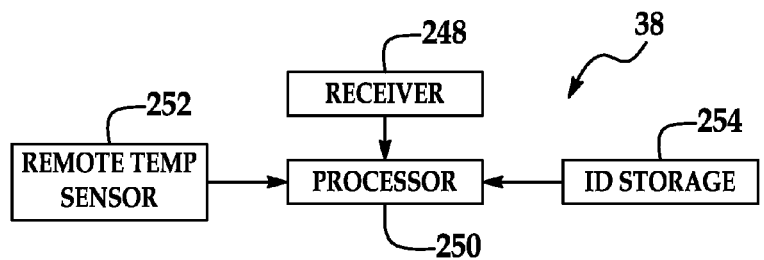
FIG. 21 is an illustration of a functional block diagram of the components of a reader including a remote temperature sensor.

FIG. 21 illustrates the basic components of a reader 38 employing a remote temperature sensor 224. The reader 38 includes a receiver 248 for receiving data packets from the fasteners 30, along with the remote temperature sensor 224, a processor 250 and fastener ID storage 254. The processor 250 associates fastener ID in storage 254 with the temperature of a fastener 30 sensed by the remote temperature sensor 224. The processor 250 may perform calculations that include adjustment of the time-of-flight data and calculates the parameters of interest, such as preload on the fastener 30.

Figure 22:
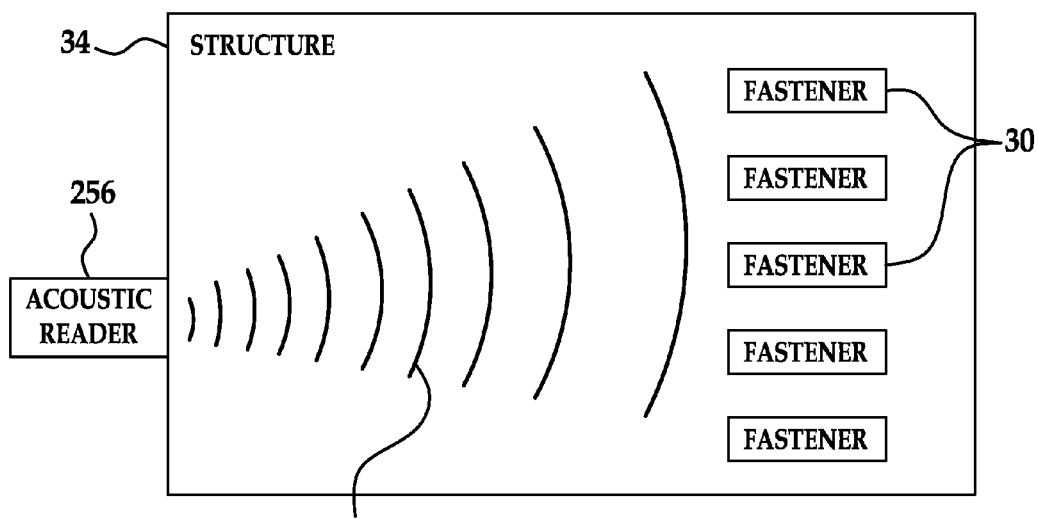
FIG. 22 is an illustration of a combined block and diagrammatic view of a reader employing an acoustic signal to query fasteners.

FIG. 22 illustrates the use of an acoustic reader 256 that is used to collect data from a plurality of fasteners 30 installed on the structure 34 using acoustic signal communications. In this embodiment, the acoustic reader 256 is brought into physical engagement with the structure 34, and an acoustic signal 260 is transmitted from the reader 256 through the structure 34 to each of the fasteners 30. Thus, the structure 34 acts as the transmission medium for carrying acoustic energy signals between the reader 256 and the fasteners 30. The use of an acoustic reader 256 is particularly advantageous where the fasteners 30 are located inside a closed structure made of materials such as composites that may not be transparent to electromagnetic radiation signals. Long wavelength acoustic signals may generally propagate through most structures farther than short wavelength signals, however, but the data rate of long wavelength signals may be less than for short wavelength signals. Thus, it may be desirable to provide the user with the option of selecting two or more communication wavelengths.

Figure 23:
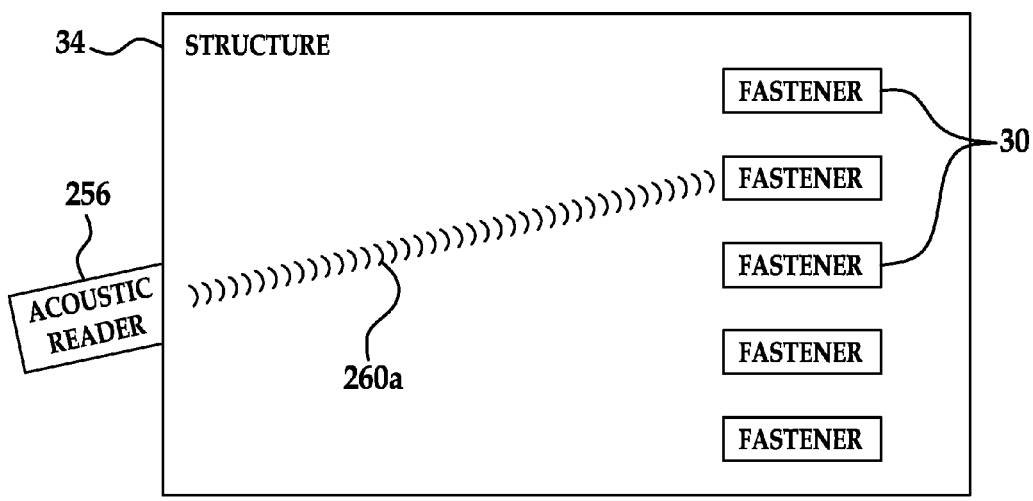
FIG. 23 is an illustration similar to FIG. 22 but showing an acoustic reader using a focused acoustic signal to query the fasteners.

FIG. 23 illustrates another embodiment of the apparatus in which a directional acoustic reader 256 is employed to direct an acoustic query signal 260a along relatively narrow path through a structure 34 to a particular fastener 30. This embodiment may be advantageous in some applications where it is necessary to focus energy along the relatively narrow path in order to reach a particular fastener 30.

Figure 24:
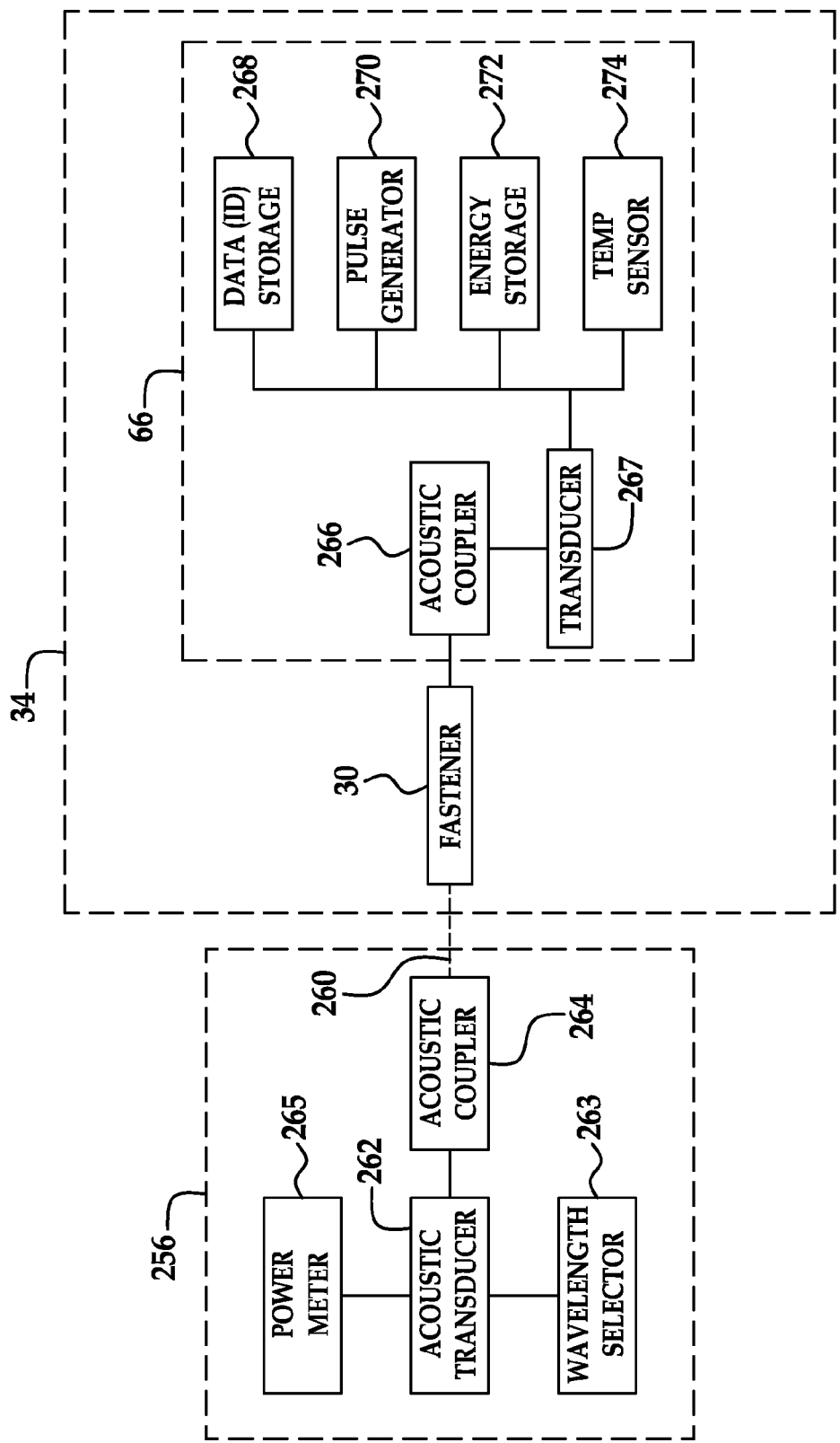
FIG. 24 is an illustration of a functional block diagram of an acoustic reader and a fastener equipped with an acoustic transducer.

FIG. 24 shows the overall components of apparatus for collecting fastener data using acoustic signals. The acoustic reader 256 broadly comprises an acoustic transducer 262 that produces acoustic signals of a desired wavelength controlled by a wavelength selector 263. The wavelength of the acoustic signal may be selected to best suit the characteristics of the particular structure 34 on which the fasteners 30 are installed. The reader 256 further includes an acoustic coupler 264 which is placed into contact with the structure 34 and functions to couple the acoustic signal from the transducer 262 into the structure 34. In some embodiments the reader 256 may include an acoustic power meter 265 which allows a user to optimally adjust the direction of directional beam 260a which will optimally adjust the directional orientation of coupler 264.

The acoustic signal, indicated by the broken line 260, is received at the cap 66 on a particular fastener 30. The cap 66 includes an acoustic coupler 266 which couples the received acoustic signal to a transducer 267 in the cap 66. The transducer 267 converts the acoustic signal into electrical power that may be stored in the energy storage 272 and used to drive a pulse generator 270 which sends pulses to a sensor (not shown) on the fastener 30 for measuring preload. Similar to the caps 66 described earlier, the cap 66 may include storage 268 for storing the fastener ID, as well as a temperature sensor 274. Although not specifically shown in FIG. 24, the cap 66 may further include a processor and/or transmitter that is used to transmit data packets through the structure 34 to the reader 256.

Figure 25:
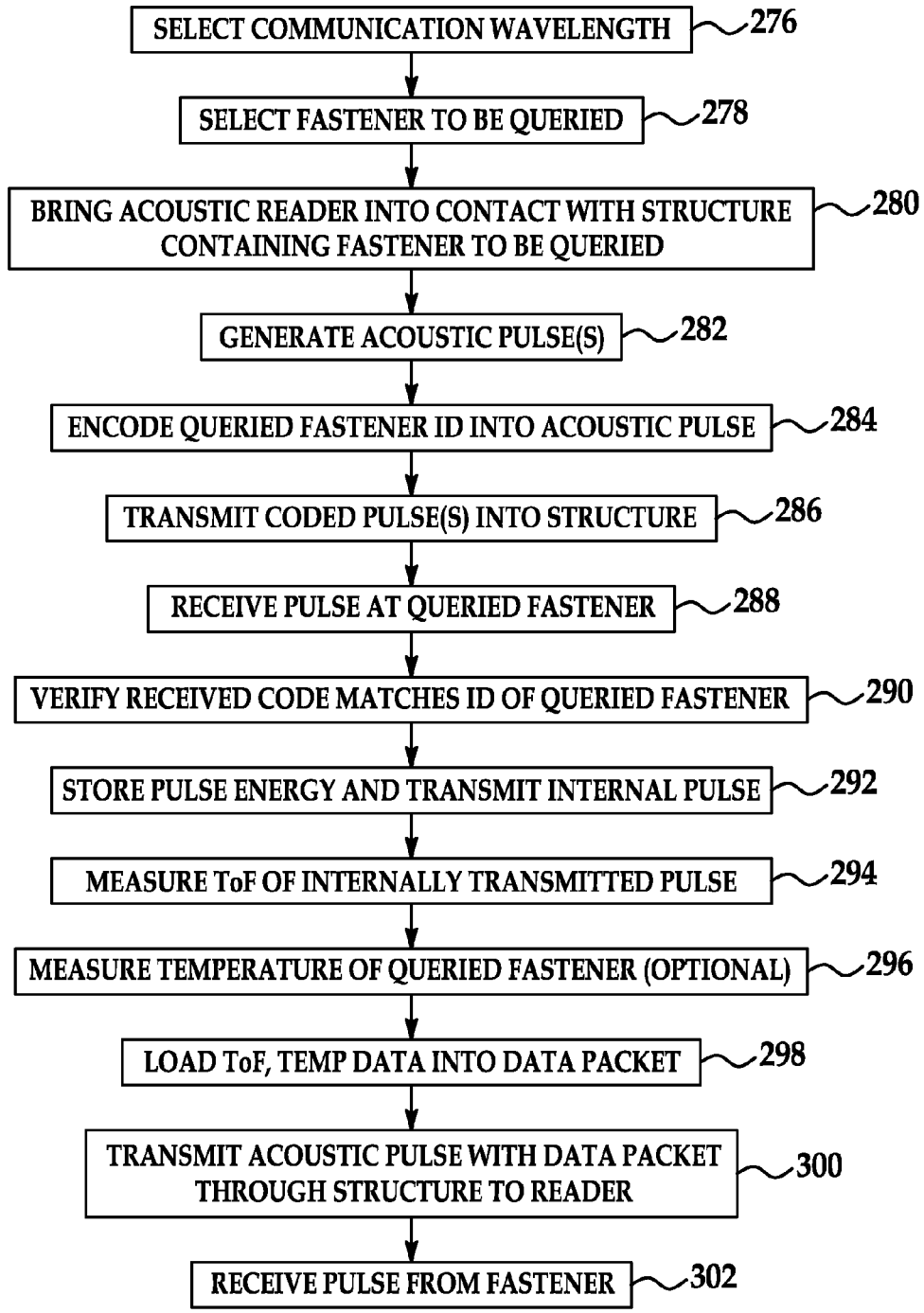
FIG. 25 is an illustration of a method of collecting fastener data using acoustic energy communications.

Attention is now directed to FIG. 25 which illustrates the steps of a method of collecting fastener data using acoustic signals. Beginning at 276, the desired communication wavelength is selected which is best suited for the particular structure 34 on which the fasteners 30 are installed. At 278, a particular fastener 30 is selected to be queried. At 280, the acoustic reader 256 is brought into physical contact with the structure 34 containing the fastener 30 to be queried. Next, at 282, one or more acoustic signals in the form of one or more acoustic pulses are generated, and at 284, the ID of the fastener to be queried is coded into the pulse(s). At 286, the coded pulses are transmitted into the structure 34 using an acoustic coupler 264 (FIG. 24). At 288, the acoustic pulses are received at the queried fastener 30, following which a check is made at the fastener 30 to verify that the received ID code matches the ID of the queried fastener, as shown at step 290.

At 292, the acoustic energy pulse is stored and is used to generate and transmit an internal pulse into the fastener 30. At 294, the time-of-flight of the internally transmitted pulse is measured. Optionally, at 296, the temperature of the queried fastener is measured. At step 298, the time-of-flight data along with temperature and other data is loaded into a data packet which is transmitted at 300 in the form of acoustic pulses which propagate through the structure 34 to the reader 256. At step 302, the acoustic pulses from the fastener 30 are received at the reader 256 and are processed to determine the stress on the fastener 30.

Figure 26:
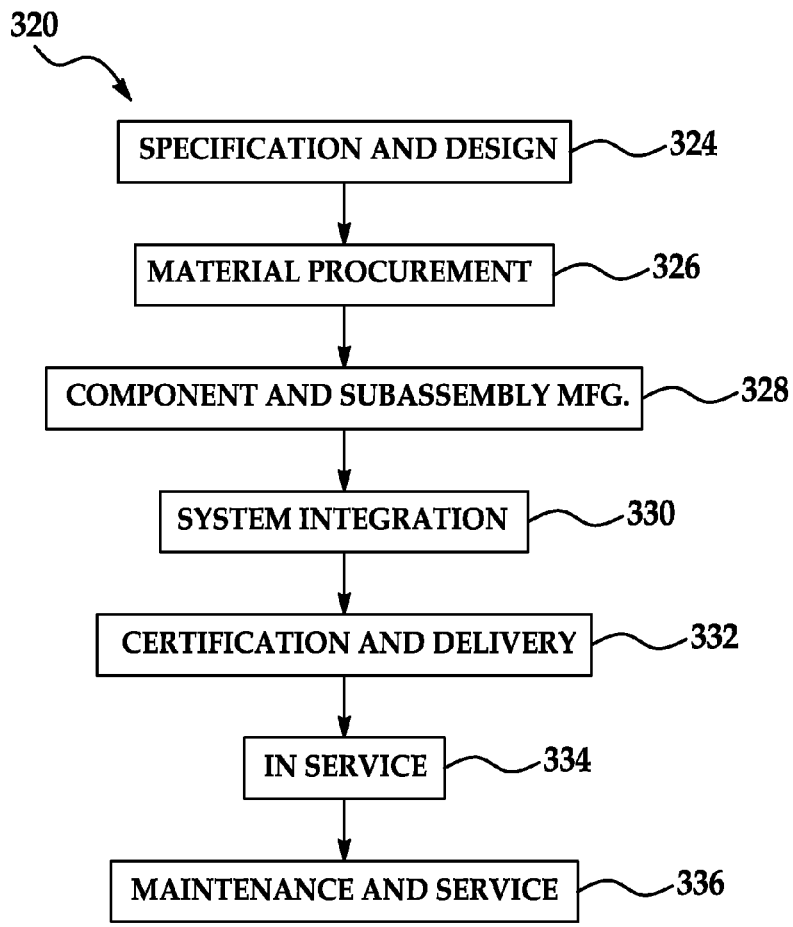
FIG. 26 is an illustration of a flow diagram of aircraft production and service methodology.
Figure 27:
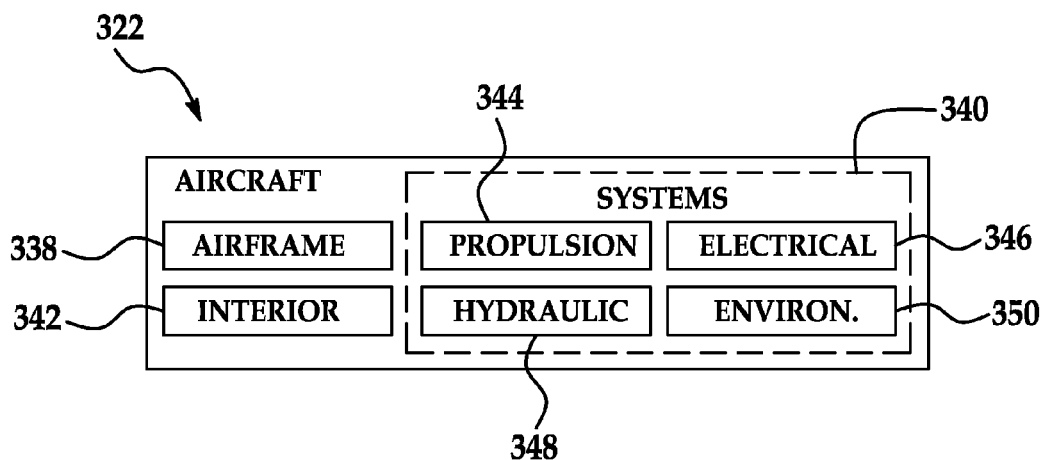
FIG. 27 is an illustration of a block diagram of an aircraft.

Embodiments of the disclosure may find use in a variety of potential applications, particularly in the transportation industry, including for example, aerospace, marine and automotive applications. Thus, referring now to FIGS. 26 and 27, embodiments of the disclosure may be used in the context of an aircraft manufacturing and service method 320 as shown in FIG. 26 and an aircraft 322 as shown in FIG. 27. During pre-production, exemplary method 320 may include specification and design 324 of the aircraft 322 and material procurement 326 in which the disclosed embodiments may be specified for use in installing and/or monitoring fasteners in the aircraft 322. During production, component and subassembly manufacturing 328 and system integration 330 of the aircraft 322 takes place. The disclosed embodiments may be used to install and monitor fasteners used in the components and subassemblies. Thereafter, the aircraft 322 may go through certification and delivery 332 in order to be placed in service 334. While in service by a customer, the aircraft 322 is scheduled for routine maintenance and service 336 (which may also include modification, reconfiguration, refurbishment, and so on). The disclosed method may be used to check or monitor the preload of fasteners during certification 332 and/or during the maintenance and service 336.

Each of the processes of method 320 may be performed or carried out by a system integrator, a third party, and/or an operator (e.g., a customer). For the purposes of this description, a system integrator may include without limitation any number of aircraft manufacturers and major system subcontractors; a third party may include without limitation any number of vendors, subcontractors, and suppliers; and an operator may be an airline, leasing company, military entity, service organization, and so on.

As shown in FIG. 27, the aircraft 322 produced by exemplary method 320 may include an airframe 338 with a plurality of systems 340 and an interior 342. Examples of high-level systems 340 include one or more of a propulsion system 344, an electrical system 346, a hydraulic system 348, and an environmental system 350. Any number of other systems may be included. The disclosed embodiments may be used to install and/or monitor fasteners in joints forming part of the airframe 338, or on components forming part of the propulsion system 344 or the hydraulic system 348. Although an aerospace example is shown, the principles of the disclosure may be applied to other industries, such as the marine, heavy equipment, power generation, refinery, and automotive industries.

The disclosed embodiments may be employed to measure the preload of fasteners installed on the aircraft 322 during any one or more of the stages of the production and service method 320. For example, components or subassemblies corresponding to production process 328 may incorporate fasteners requiring accurate measurement of preload. Also, one or more method embodiments, or a combination thereof may be utilized during the production stages 328 and 330, for example, by substantially expediting assembly of or reducing the cost of an aircraft 322.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system, comprising:
    a fastener, adapted to mechanically join at least two separate structural members together, having a fastener head with a recess containing a sensor for measuring stress on the fastener;
    a removable cap, having a cap head and sides surrounding the fastener head, wherein the removable cap is configured to engage and disengage the fastener head by a twisting motion of the cap relative to the fastener, the cap having an electronic circuit, configured to wirelessly transmit data related to the measured stress, the cap having at least one electrical contact protruding from underneath the cap head and surrounded by the cap sides, the electrical contact coupled to the electronic circuit within the cap, the electrical contact positioned to, within the recess of the fastener head, engage the sensor when the cap is attached to the fastener;
    a power source for powering the electronic circuit, comprising a thermal energy harvesting device, disposed in the cap;
    a reader, configured for wirelessly reading the data transmitted by the cap; a wireless transmitter in the reader, configured for wirelessly transmitting a signal to the cap;
    a wireless receiver in the cap, configured for receiving the signal from the reader; and
    an electronic converter, associated with the cap, configured to convert the signal received from the reader into electrical energy produced by the signal and configured to store the electrical energy produced by the signal at the storage device, wherein the cap further includes a storage device configured to store electrical energy produced by the signal received from the reader.

2. A system in accordance with claim 1, further comprising:
    an antenna in the cap; and
    a wireless transmitter in the cap, coupled with the antenna, configured for transmitting the data to the reader.

3. A system in accordance with claim 2, wherein the wireless receiver is selected from the group consisting of a light signal receiver, a radio frequency signal receiver, and an acoustic signal receiver.

4. A system in accordance with claim 1, wherein the cap further includes a temperature sensor for sensing a temperature of the fastener, and the cap is configured for wirelessly transmitting data related to the sensed temperature to the reader.

5. A system in accordance with claim 1, wherein the cap further includes:
    a pulse generator, configured to convert the stored electrical energy produced by the signal received from the reader into a pulse used to activate the sensor.

6. A system in accordance with claim 1, wherein the reader is configured for wirelessly transmitting a first signal along a narrow path to the cap, the system further comprising:
    a receiver on the cap configured to receive the first signal the receiver including a directional antenna for receiving the first signal along the narrow path; and
    a transmitter on the cap configured to wirelessly transmit a second signal to the reader containing data related to the stress measured by the sensor.

7. A system in accordance with claim 6, wherein the directional antenna is one of a directional dipole antenna and a dish antenna.

8. A system in accordance with claim 6, wherein:
    the reader includes a transmitter selected from the group consisting of a radio frequency transmitter, an infrared beam transmitter, and an acoustic energy transmitter;
    the first signal is a signal selected from the group consisting of a radio frequency signal, an infrared beam, and an acoustic signal; and
    the receiver on the fastener is selected from the group consisting of a radio frequency receiver, an infrared receiver, and an acoustic signal receiver.

9. A cap, configured to attach to a fastener having a fastener head with a recess containing a sensor for measuring stress on the fastener, the cap comprising:
    a cap head and sides configured to surround the fastener head when the cap is attached to the fastener;
    a cap attachment mechanism configured to engage and disengage the fastener head by a twisting motion of the cap relative to the fastener;
    an electronic circuit, disposed in the cap;
    at least one electrical contact protruding from underneath the cap head and surrounded by the cap sides, the electrical contact coupled to the electronic circuit within the cap, the electrical contact positioned to, within the recess of the fastener head, engage the sensor when the cap is attached to the fastener;
    a wireless transmitter, associated with the electronic circuit, configured to transmit stress data, based on the stress measurements, to a reader;
    a wireless receiver for receiving a query signal from the reader;
    an electronic converter configured for converting the query signal into electrical energy produced by the query signal and for storing the electrical energy produced by the query signal;
    a thermal energy harvesting device;
    a storage device configured to store electrical energy produced by the query signal for use in powering the sensor;
    a data packet circuit within the cap, the data packet circuit configured to combine a unique identifier associated with the cap with the stress data before the stress data is transmitted to the reader; and
    a temperature sensor on the cap, configured for sensing a temperature of the fastener, the cap configured for wirelessly transmitting data related to the sensed temperature to the reader.

10. A cap in accordance with claim 9, further comprising:
    an antenna, coupled to the wireless transmitter for transmitting the stress data to the reader.

11. A cap in accordance with claim 9, further comprising a transmitter configured to wirelessly transmit an acoustic signal through the structure, the acoustic signal representing the stress data.

* * * * *